US010248548B2

(12) United States Patent
Tzabari et al.

(10) Patent No.: US 10,248,548 B2
(45) Date of Patent: Apr. 2, 2019

(54) CODE COVERAGE INFORMATION

(71) Applicant: ENTIT Software LLC, Sunnyvale, CA (US)

(72) Inventors: Liron Tzabari, Yehud (IL); Elad Benedict, Yehud (IL); Nathan Grunzweig, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/560,571

(22) PCT Filed: Apr. 15, 2015

(86) PCT No.: PCT/US2015/025879
§ 371 (c)(1),
(2) Date: Sep. 22, 2017

(87) PCT Pub. No.: WO2016/167760
PCT Pub. Date: Oct. 20, 2016

(65) Prior Publication Data
US 2018/0101468 A1    Apr. 12, 2018

(51) Int. Cl.
*G06F 11/36* (2006.01)
*G06F 9/44* (2018.01)
*G06F 9/45* (2006.01)
*G06F 8/75* (2018.01)
*G06F 8/33* (2018.01)
*G06F 8/71* (2018.01)

(52) U.S. Cl.
CPC ............ *G06F 11/3676* (2013.01); *G06F 8/33* (2013.01); *G06F 8/75* (2013.01); *G06F 11/3664* (2013.01); *G06F 11/3688* (2013.01); *G06F 11/3692* (2013.01); *G06F 8/71* (2013.01)

(58) Field of Classification Search
CPC ............... G06F 11/3676; G06F 11/368; G06F 11/3684; G06F 11/3692; G06F 11/3688; G06F 11/3664; G06F 8/33; G06F 8/75; G06F 8/71
See application file for complete search history.

(56) References Cited

U.S. PATENT DOCUMENTS 7,089,535 B2   8/2006  Bates et al.
8,079,018 B2  12/2011  Huene et al.
8,166,463 B2   4/2012  Gill et al.
(Continued)

OTHER PUBLICATIONS

H. Hariri, Show Covering Tests with dotCover, Jul. 2010, 6 pages.*
(Continued)

*Primary Examiner* — Thuy Dao
(74) *Attorney, Agent, or Firm* — Trop, Pruner & Hu, P.C.

(57) ABSTRACT

A technique includes obtaining code coverage information related to lines of code. The code coverage information indicates how the lines of code are covered by a plurality of tests. The technique includes generating a two-way mapping based on the code coverage information. The two-way mapping includes a first mapping that maps a particular test in the plurality of tests to at least one line in the lines of code, which is covered by the particular test; and a second mapping that maps a particular line of code in the lines of code to at least one test in the plurality of tests, which covers the particular line of code.

10 Claims, 6 Drawing Sheets

(56) References Cited

U.S. PATENT DOCUMENTS

| | | | |
|---|---|---|---|
| 8,276,123 B1* | 9/2012 | Deng | G06F 11/3688 |
| | | | 714/37 |
| 8,381,184 B2 | 2/2013 | Johnson et al. | |
| 8,473,915 B2 | 6/2013 | Brodsky et al. | |
| 8,954,926 B2* | 2/2015 | Braun | G06F 11/3676 |
| | | | 717/115 |
| 9,069,899 B2* | 6/2015 | Bragdon | G06F 11/3664 |
| 9,189,372 B2* | 11/2015 | Adler | G06F 11/3676 |
| 9,361,211 B2* | 6/2016 | Gupta | G06F 11/3688 |
| 9,619,363 B1* | 4/2017 | Chitale | G06F 11/3692 |
| 9,678,718 B1* | 6/2017 | Bienkowski | G06F 8/20 |
| 9,703,552 B2* | 7/2017 | Bates | G06F 8/71 |
| 9,990,272 B2* | 6/2018 | Cooper | G06F 11/3676 |
| 10,031,835 B2* | 7/2018 | Kral | G06F 11/3648 |
| 10,078,574 B2* | 9/2018 | Lopian | G06F 11/3668 |
| 2009/0313607 A1 | 12/2009 | Harding et al. | |
| 2010/0146340 A1 | 6/2010 | Bhate et al. | |
| 2013/0091490 A1* | 4/2013 | Mizrahi | G06F 11/3676 |
| | | | 717/122 |
| 2013/0298110 A1 | 11/2013 | Boden et al. | |
| 2014/0379885 A1* | 12/2014 | Krishnamurthy | H04L 45/56 |
| | | | 709/223 |

OTHER PUBLICATIONS

S. Simonchik, Code Coverage for JavaScript Unit Testing, Apr. 2012, 8 pages.*

McIntosh et al., The impact of code review coverage and code review participation on software quality: a case study of the qt, VTK, and ITK projects, 10 pages (Year: 2014).*

V. Araya, Test blueprint: an effective visual support for test coverage, 3 pages (Year: 2011).*

Zhang, L., et al., Panappticon: Event-based Tracing to Measure Mobile Application and Platform Performance, Codes+ISSS'13, Sep. 29-Oct. 4, 2013, 10 pages.

International Searching Authority., International Search Report and Written Opinion dated Jan. 15, 2016 for PCT Application No. PCT/US2015/025879, Filed Jan. 15, 2015, 10 pgs.

Oracle Solaris; "Oracle Solaris Studio Code Analyzer"; 2014 (month and day unknown); 5 pp.

* cited by examiner

CODE COVERAGE INFORMATION

BACKGROUND

Software programs are often tested by running a testing script to verify that the program and the source code therein behave as expected and intended. Source code may include multiple modules, subroutines, objects, threads, functions, and other structures depending on the type of code. Code coverage tools may seek to systematically test or exercise these modules, subroutines, objects, threads, functions, and other structures.

BRIEF DESCRIPTION OF THE DRAWINGS

The following detailed description references the drawings, wherein.

DETAILED DESCRIPTION

Figure 1:
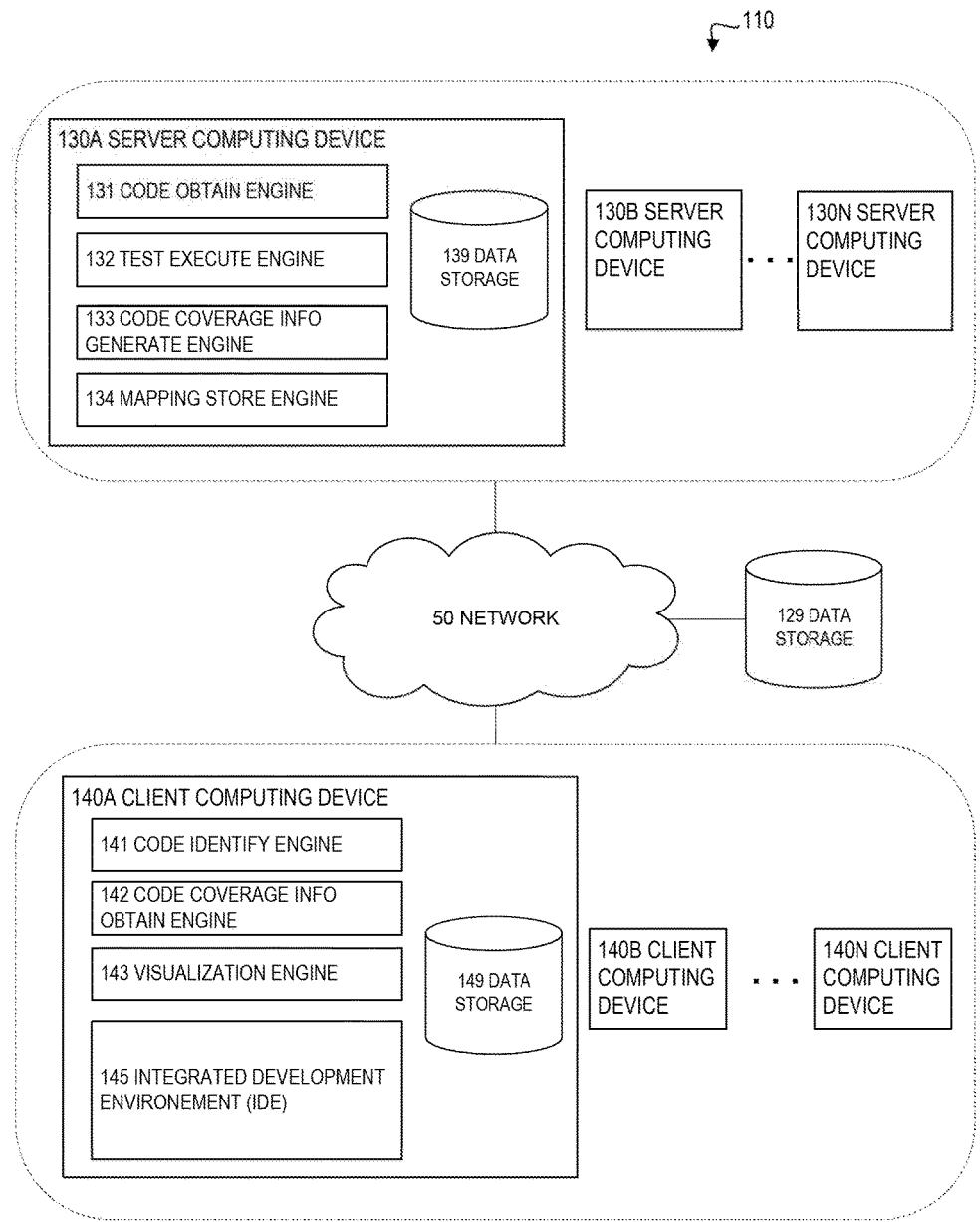
FIG. 1 is a block diagram depicting an example code coverage information system comprising various components including a client computing device in communication with a server computing device for providing code coverage information.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Software programs are often tested by running a testing script to verify that the program and the source code therein behave as expected and intended. Source code may include multiple modules, subroutines, objects, threads, functions, and other structures depending on the type of code. Code coverage tools may seek to systematically test or exercise these modules, subroutines, objects, threads, functions, and other structures. Often, a developer of a software program using a developer's tool (e.g., an integrated development environment (IDE)) needs to stop coding while the testing of the source code is being executed. For example, the IDE can block the developer from coding during this testing period. As such, it is technically challenging to allow the testing of the source code and the development or coding of the software program to occur simultaneously without interfering one another.

Examples disclosed herein provide technical solutions to these technical challenges by keeping the functions related to the testing of the source code physically separated from a developer's tool such as the IDE running on a client computing device. The developer may continue to code using the IDE without being blocked by the IDE from coding while a testing script is run, code coverage information is generated, and/or the code coverage information is visualized. In other words, the code coverage information may be continuously updated and/or visualized (e.g., the lines of code being color-coded) based on the code coverage information while the developer continues to code using the IDE. For example, the developer may add a new line to the lines of code. After a few seconds later, the code coverage information related to the new line may be visualized (e.g., the first new line being highlighted in green) on the screen of the IDE while the developer is simultaneously making further modifications to the lines of code in the IDE.

The examples enable obtaining code coverage information related to lines of code. The code coverage information may indicate how the lines of code are covered by a plurality of tests. The examples further enable generating a two-way mapping based on the code coverage information. The two-way mapping may comprise a first mapping that maps a particular test in the plurality of tests to at least one line in the lines of code that is covered by the particular test and a second mapping that maps a particular line of code in the lines of code to at least one test in the plurality of tests that covers the particular line of code.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram depicting an example system 110 comprising various components including a client computing device in communication with a server computing device for managing cross-domain information.

The various components may include client computing devices 140 (illustrated as 140A, 140B, ... 140N) and server computing devices 130 (illustrated as server computing device 130A, 130B, ..., 130N). Each client computing device 140A, 140B, ..., 140N may communicate requests to and/or receive responses from server computing device 130. Server computing device 130 may receive and/or respond to requests from client computing devices 140. Client computing devices 140 may include any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, and 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 110 and the various components described herein may be implemented in hardware and/or programming that configures hardware. Furthermore, in FIG. 1 and other Figures described herein, different numbers of components or entities than depicted may be used.

As detailed below, server computing device 130 may comprise a code obtain engine 131, a test execute engine 132, a code coverage information generate engine 133, a mapping store engine 134, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Figure 7:
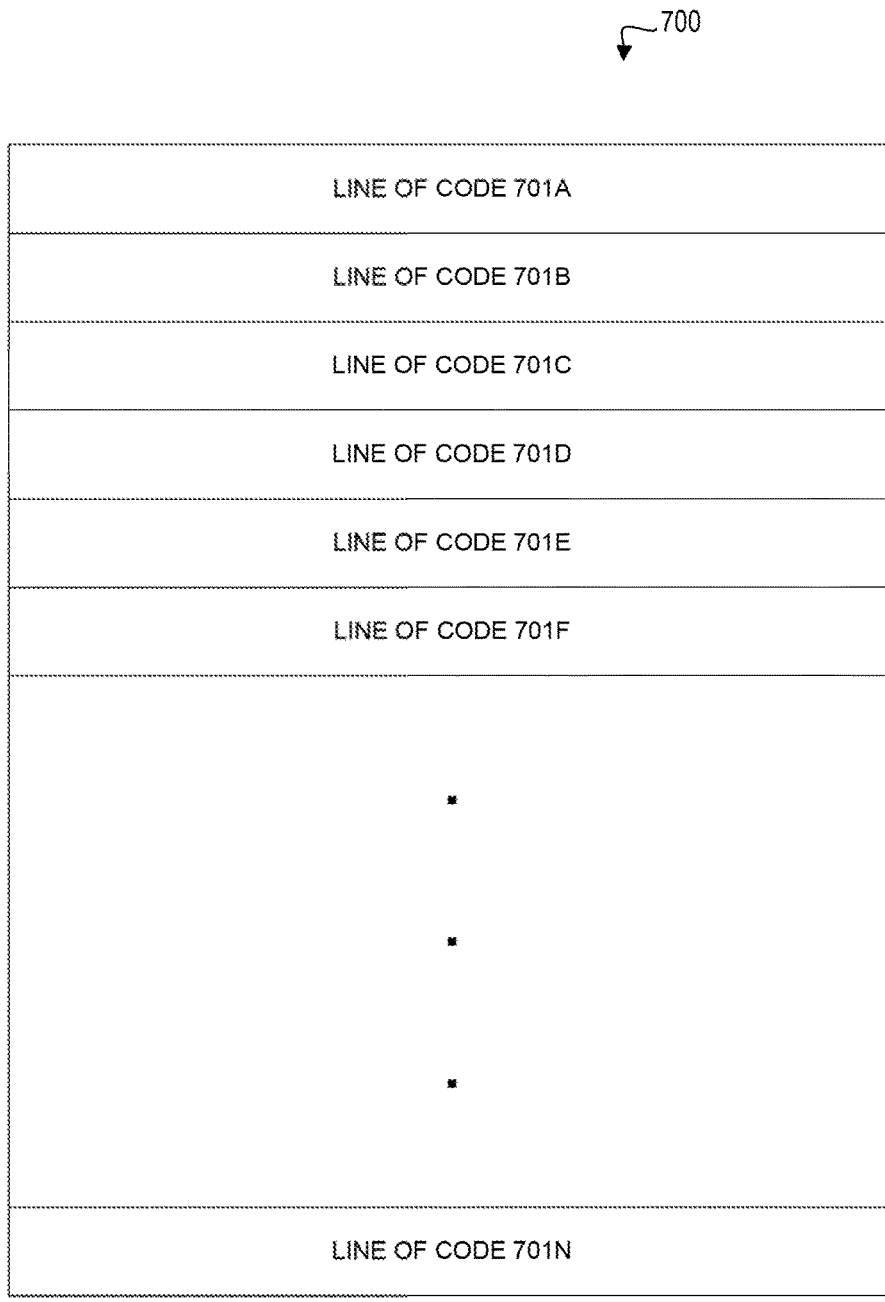
FIG. 7 is a diagram depicting an example user interface for providing code coverage information.

Code obtain engine 131 may receive or otherwise obtain lines of code and/or any changes (e.g., additions, deletions, and/or modifications) to the lines of code from a client computing device (e.g., client computing device 140). A "line of code," as used herein, may represent a line in the text of a software application's source code. Example lines of code are illustrated in FIG. 7. The lines of code may include lines of code 701A-N. Any lines in lines of code 701A-N can be modified and/or deleted. A new line may be added to lines of code 701A-N. For example, a new line may be inserted before (e.g., on the top of) lines of code 701A-N, in between line of code 701D and line of code 701E, and/or after (e.g., at the bottom of) lines of code 701A-N.

In some examples, a software developer may develop a software application having at least the lines of code using a developer's tool such as an integrated development environment (IDE) (e.g., IDE 145) that may run on client computing device 140. As the developer continues to code using IDE 145, code obtain engine 131 may receive and/or obtain the lines of code and/or any changes to the lines of code from client computing device 140. In some implementations, any changes to the lines of code can be identified by client computing device 140 and/or transmitted from client computing device 140 to a server computing device (e.g., server computing device 130), as discussed herein with respect to code identify engine 141. For example, the changes may be transmitted from client computing device 140 to server computing device 130 regularly based on a predetermined time interval (e.g., 5 seconds, 2 minutes, etc.).

In some implementations, the lines of code and/or any changes to the lines of code obtained by code obtain engine 131 may be stored in a local data storage (e.g., a data storage 139) of server computing device 130 or a remote data storage (e.g., a data storage 129) that is connected to server computing device 130 via network (e.g., network 50).

Test execute engine 132 may cause and/or trigger a plurality of tests (or any portion thereof) to be executed and/or run. A "test," as used herein, may refer to a single test or a test suite comprising a set of related tests. When a particular test is executed, a testing script corresponding to the particular test may be executed and/or run. When executed, the particular test may cover all or some of the lines of code. In some implementations, any testing software known in the art may be used to execute and/or run the plurality of tests (or any portion thereof) as discussed herein.

Code coverage information generate engine 133 may generate code coverage information related to the lines of code (e.g., obtained by code obtain engine 131). The code coverage information may indicate how the lines of code are covered by a plurality of tests. A particular line of code being "covered" by a particular test, as used herein, may mean that the particular test has reached that particular line of code and the test has been executed and/or run on that particular line of code. For example, the particular test may test various functionalities (e.g., clicking a particular graphical user interface (GUI) button) of the software application. If the particular line of code is related to the particular GUI button being tested, it may be said that the particular line of code is "covered" by the particular test. On the other hand, if the particular line of code is part of another functionality that is not subject to the particular test, it may be said that the particular line of code is "not covered" by the particular test.

The particular line of code may pass the particular test (e.g., covering the particular line). For example, passing the test may mean that the particular line complies with all of the rules imposed by the particular test. On the other hand, the particular line may fail the particular test (e.g., covering the particular line). For example, failing the test may indicate that the particular line of code does not comply with at least one of the rules imposed by the particular test.

When the plurality of tests are executed, all or some of the plurality of tests may cover the particular line of code. The code coverage information related to the particular line may comprise a first indication that the particular line passed all of the tests covering the particular line, a second indication that the particular line failed at least one test covering the particular line, a third indication that the particular is not covered by any of the plurality of tests, and/or other indications. In some instances, the particular line of code may not have any related code coverage information because, for example, the particular line has been newly added just a second ago and the code coverage information regarding the particular line is yet to be generated and/or obtained. In these instances, a status associated with this newly added line may indicate that the code coverage information is "uncertain" for this particular line, for example.

Code coverage information generate engine 133 may generate code coverage information related to any changes made to the lines of code (e.g., obtained by code obtain engine 131). As discussed above with respect to code obtain engine 131, an indication that a new line has been added to the lines of code may be received (e.g., when the developer adds or inserts the new line using IDE 145 running on client computing device 140). This may include obtaining, from client computing device 140, the new line. This may trigger and/or cause the plurality of tests (or any portion thereof) to be executed and/or run (e.g., as discussed herein with respect to test execute engine 132). Code coverage information generate engine 133 may obtain the code coverage information related to the new line where the code coverage information related to the new line may indicate how the new line is covered by the plurality of tests. For example, the code coverage information related to the new line may comprise at least one of: a first indication that the new line passed all of the tests covering the new line, a second indication that the new line failed at least one test covering the new line, and a third indication that the new line is not covered by any of the plurality of tests. Similarly, deletions of any lines from the lines of code may trigger and/or cause the plurality of tests (or any portion thereof) to be executed and/or run (e.g., as discussed herein with respect to test execute engine 132).

As discussed above with respect to code obtain engine 131, an indication that a particular line in the lines of code has been modified may be received (e.g., when the developer modifies the particular line in IDE 145 running on client computing device 140). This may include obtaining, from client computing device 140, the modified line. This may trigger and/or cause the plurality of tests (or any portion thereof) to be executed and/or run (e.g., as discussed herein with respect to test execute engine 132). In some instances, the tests that previously covered the particular line prior to the modification may be identified and/or executed for the purpose of speed and efficiency. Such tests may be identified by, for example, referring to a two-way mapping (e.g., that is generated by mapping store engine 134 as discussed herein). Code coverage information generate engine 133 may obtain the code coverage information related to the modified line where the code coverage information related to the modified line may indicate how the modified line is covered by the plurality of tests. For example, the code coverage information related to the modified line may comprise at least one of: a first indication that the modified line passed all of the tests covering the modified line, a second indication that the modified line failed at least one test covering the modified line, and a third indication that the modified line is not covered by any of the plurality of tests.

In some implementations, code coverage information generate engine 133 may send or otherwise provide the code coverage information (or at least a portion thereof) to client computing device 140 comprising IDE 145 in which the code coverage information is visualized. The code coverage information generated by code coverage information generate engine 133 may be transmitted to client computing device 140 and/or obtained by client computing device 140, as discussed herein with respect to code coverage information obtain engine 142. The visualization of the code coverage information is further discussed herein with respect to visualization engine 143. For example, a first line in the lines of code may be shown visually different (e.g., different color-coding) from a second line in the lines of code based on the code coverage information.

In some implementations, the code coverage information generated by code coverage information generate engine 133 may be stored in a local data storage (e.g., a data storage 139) of server computing device 130 or a remote data storage (e.g., a data storage 129) that is connected to server computing device 130 via network (e.g., network 50).

Mapping store engine 134 may generate a two-way mapping based on the code coverage information (e.g., generated and/or obtained by code coverage information generate engine 133). The two-way mapping may comprise a first mapping that maps a particular test in the plurality of tests to at least one line in the lines of code that is covered by the particular test. The two-way mapping further comprise a second mapping that maps a particular line of code in the lines of code to at least one test in the plurality of tests that covers the particular line of code. For example, in the first mapping, a first test may be associated with a first set of lines that the first test previously covered according to the code coverage information, a second test may be associated with a second set of lines (e.g., that may or may not overlap with the first set of lines) that the second test previously covered according to the code coverage information, and so on. The second mapping, on the other hand, may show that which tests covered a particular line of code. For example, a first line may be associated with a first set of tests that previously covered the first line according to the code coverage information, a second line may be associated with a second set of tests (e.g., that may or may not overlap with the first set of tests) that previously covered the second line according to the code coverage information, and so on.

As discussed above with respect to code coverage information generate engine 133, an indication that a particular line in the lines of code has been modified may be received (e.g., when the developer modifies the particular line in IDE 145 running on client computing device 140). This may include obtaining, from client computing device 140, the modified line. This may trigger and/or cause the plurality of tests (or any portion thereof) to be executed and/or run (e.g., as discussed herein with respect to test execute engine 132). In some instances, the tests that previously covered the particular line prior to the modification may be identified and/or executed for the purpose of speed and efficiency. Such tests may be identified by, for example, referring to the two-way mapping. For example, the two-way mapping may provide information regarding which tests previously covered the particular line prior to the modification. In some implementations, the two-way mapping may be outputted as a report that can be easily accessible and viewable by users.

In some implementations, the two-way mapping may be stored in a local data storage (e.g., a data storage 139) of server computing device 130 or a remote data storage (e.g., a data storage 129) that is connected to server computing device 130 via network (e.g., network 50).

By keeping the functions of code obtain engine 131, code coverage information generate engine 133, mapping store engine 134, and/or test execute engine 132 (e.g., as discussed above) physically separated from a developer's tool such as IDE 145 running on client computing device 140, a developer may continue to code using IDE 145 without being blocked by IDE 145 from coding while a testing script is run, code coverage information is generated, and/or the code coverage information is visualized. In other words, the code coverage information may be continuously updated and/or visualized (e.g., the lines of code being color-coded) based on the code coverage information while the developer continues to code using IDE 145. For example, the developer may add a new line to the lines of code. After a few seconds later, the code coverage information related to the new line may be visualized (e.g., the first new line being highlighted in green) on the screen of IDE 145 while the developer is simultaneously making further modifications to the lines of code in IDE 145.

In performing their respective functions, engines 131-134 may access data storage 129, data storage 139, and/or other suitable database(s). Data storage 129 and/or 139 may represent any memory accessible to code coverage information system 110 that can be used to store and retrieve data.

As detailed below, client computing device 140 may comprise a code identify engine 141, a code coverage information obtain engine 142, a visualization engine 143, and/or other engines.

Code identify engine 141 may identify a first set of changed lines of code that may represent changes made to the lines of code. For example, a developer may make the changes (e.g., additions, deletions, and/or modifications) to the lines of code using IDE 145 running on client computing device 140.

In some implementations, the first set of changed lines of code may represent the changes made during a first time period between a first timestamp and a second timestamp. Any further changes made during a second time period between the second timestamp and a third timestamp may be combined as a second set of changed lines of code. Similarly, a third set of changed liens of code may represent the changed made during a third time period between the third timestamp to a fourth timestamp, and so on.

In some implementations, the changes made to the lines of code are tracked via a version-control system (VCS) (e.g., an external VCS (not shown) connected to server computing device 130 and client computing device 140 via network 50). Any version-control techniques known in the art may be used. For example, the VCS may track the identification of the developer who made the changes, a duration of the check-out, a version number, and/or other change history related to the lines of code. In addition, VCS may also provide a capability to rollback any changes made to the lines of code.

Code identify engine 141 may transmit the first (and/or second) set of changed lines of code to server computing device 130. In some implementations, the first (and/or second) set of changed lines may be transmitted to server computing device 130 via the version-control system. For example, after the changes are committed to the version-control system, the changes are subsequently provided to server computing device 130. In some implementations, the changes may be transmitted from client computing device 140 to server computing device 130 regularly based on a predetermined time interval (e.g., 5 seconds, 2 minutes, etc.). In these implementations, the first set of changed lines may be transmitted at a first time, and after the predetermined time interval has elapsed, the second set of changed lines may be transmitted a second time. In other words, the first time and the second time may be separated by the predetermined time interval. In other implementations, every single change made to the lines of code may be instantaneously transmitted to server computing device 130.

Code coverage information obtain engine 142 may receive and/or obtain, from server computing device 130, code coverage information associated with the first (and/or second) set of changed lines of code. For example, the code coverage information associated with the first set of changed lines of code may indicate how the first set of changed lines of code is covered by the plurality of tests. The code coverage information associated with a particular line in the first set of changed lines may comprise at least one of: a first indication that the particular line passed all of the tests covering the particular line, a second indication that the particular line failed at least one test covering the particular line, and a third indication that the particular line is not covered by any of the plurality of tests.

Visualization engine 143 may determine a visual indicator that corresponds to the code coverage information associated with individual lines in the first (and/or second) set of changed lines of code. For example, each of the first, second, and third indications of the code coverage information may be associated with a particular visual indicator (e.g., a particular color, a particular font, a particular size, etc.). For instance, the first indicator (e.g., passing all of the tests) may be associated with a visual indicator of color "green." The second indicator (e.g., failing at least one test) may be associated with a visual indicator of color "red." The third indicator (e.g., not covered) may be associated with a visual indicator of color "yellow."

In some instances, the particular line may not have any related code coverage information because, for example, the particular line has been newly added just a second ago and the code coverage information regarding the particular line is yet to be generated and/or obtained. In these instances, a status associated with this newly added line may indicate that the code coverage information is "uncertain" for this particular line, for example. In this case, this "uncertain" status may have its own corresponding visual indicator such as color "grey."

Visualization engine 143 may cause a display of the first (and/or second) set of changed lines of code with corresponding visual indicators via IDE 145. For example, the individual lines in the first set of changed lines of code may be color-coded according to the corresponding visual indicators. In the example illustrated in FIG. 7, lines of code 701A-C and 701F associated with the first indicator may be highlighted in green or the font color of those lines may be green. Lines of code 701D-E associated with the second indicator may be highlighted in red or the font color of those lines may be red. Line of code 701N may represent the new line that was recently added and still has the "uncertain" status. In this case, line of code 701N may be highlighted in grey or the font color of the line may be grey. Other types of visual indicators may be used to distinguish the lines based on their code coverage information.

In performing their respective functions, engines 141-143 may access data storage 129, data storage 149, and/or other suitable database(s). Data storage 129 and/or 149 may represent any memory accessible to code coverage information system 110 that can be used to store and retrieve data.

Data storage 129 and/or other database may comprise random access memory (RAM), read-only memory (ROM), electrically-erasable programmable read-only memory (EE-PROM), cache memory, floppy disks, hard disks, optical disks, tapes, solid state drives, flash drives, portable compact disks, and/or other storage media for storing computer-executable instructions and/or data. Data storages 129 and/or other database may include a database to organize and store data. The database may reside in a single or multiple physical device(s) and in a single or multiple physical location(s). The database may store a plurality of types of data and/or files and associated data or file description, administrative information, or any other data.

Figure 2:
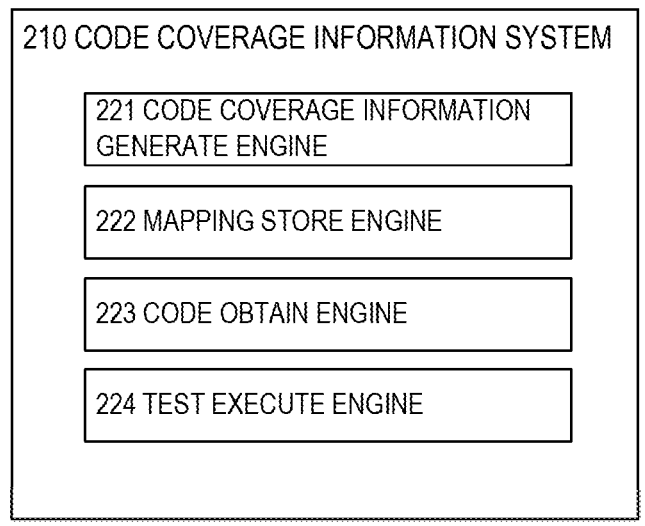
FIG. 2 is a block diagram depicting an example code coverage information system.

FIG. 2 is a block diagram depicting an example code coverage information system 210. Code coverage information system 210 may comprise a code coverage information generate engine 221, a mapping store engine 222, a code obtain engine 223, a test execute engine 224, and/or other engines. Engines 221-224 represent engines 133, 134, 131, and 132, respectively.

Figure 3:
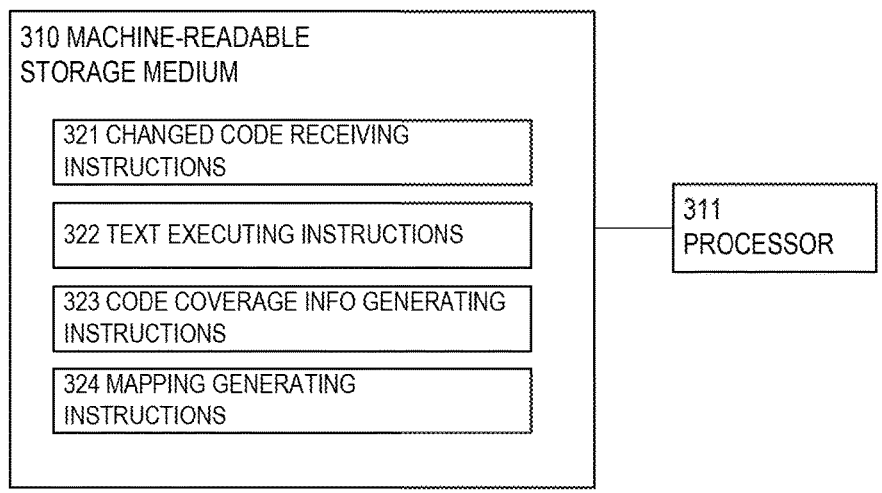
FIG. 3 is a block diagram depicting an example machine-readable storage medium comprising instructions executable by a processor for providing code coverage information.

FIG. 3 is a block diagram depicting an example machine-readable storage medium 310 comprising instructions executable by a processor for providing code coverage information.

In the foregoing discussion, engines 131-134 were described as combinations of hardware and programming. Engines 131-134 may be implemented in a number of fashions. Referring to FIG. 3, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements code coverage information system 110 of FIG. 1.

In FIG. 3, the executable program instructions in machine-readable storage medium 310 are depicted as changed code receiving instructions 321, test executing instructions 322, code coverage information generating instructions 323, and mapping generating instructions 324. Instructions 321-324 represent program instructions that, when executed, cause processor 311 to implement engines 121-124, respectively.

Figure 4:
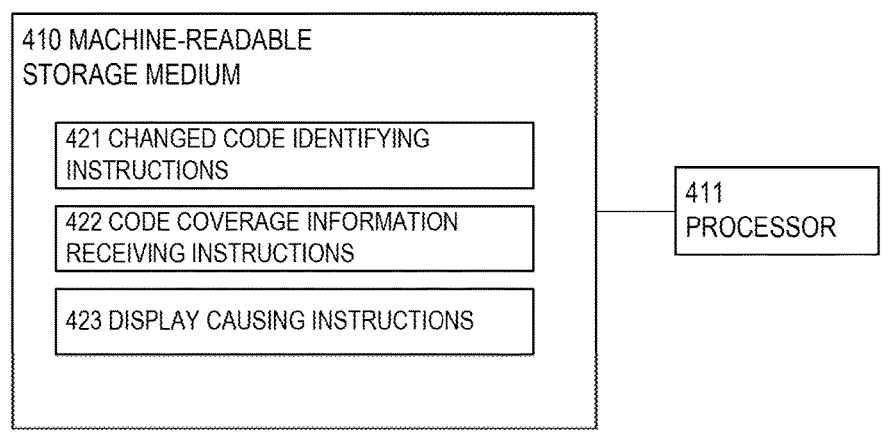
FIG. 4 is a block diagram depicting an example machine-readable storage medium comprising instructions executable by a processor for providing code coverage information.

FIG. 4 is a block diagram depicting an example machine-readable storage medium 410 comprising instructions executable by a processor for providing code coverage information.

In the foregoing discussion, engines 141-143 were described as combinations of hardware and programming. Engines 141-143 may be implemented in a number of fashions. Referring to FIG. 4, the programming may be processor executable instructions 421-423 stored on a machine-readable storage medium 410 and the hardware may include a processor 411 for executing those instructions. Thus, machine-readable storage medium 410 can be said to store program instructions or code that when executed by processor 411 implements code coverage information system 110 of FIG. 1.

In FIG. 4, the executable program instructions in machine-readable storage medium 410 are depicted as changed code identifying instructions 421, code coverage information receiving instructions 422, and display causing instructions 423. Instructions 421-423 represent program instructions that, when executed, cause processor 411 to implement engines 141-143, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement code coverage information system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-324, and/or other instructions. As an alternative or in addition to retrieving and executing instructions, processor 311 may include at least one electronic circuit comprising a number of electronic components for performing the functionality of at least one of instructions 321-324, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-423, and/or other instructions. As an alternative or in addition to retrieving and executing instructions, processor 411 may include at least one electronic circuit comprising a number of electronic components for performing the functionality of at least one of instructions 421-423, and/or other instructions.

Figure 5:
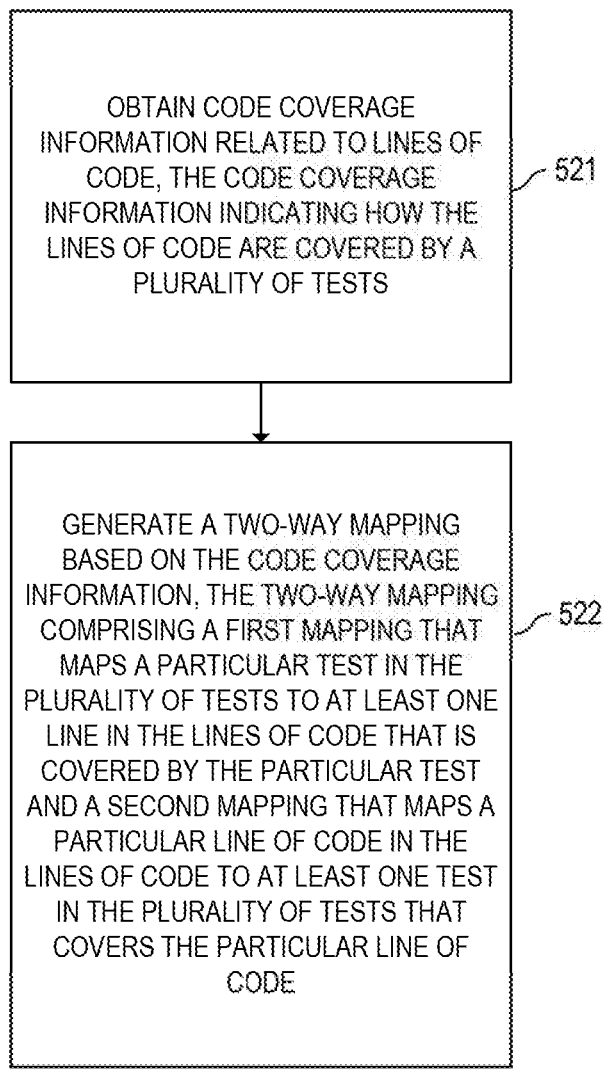
FIG. 5 is a flow diagram depicting an example method for providing code coverage information.

FIG. 5 is a flow diagram depicting an example method 500 for providing code coverage information. The various processing blocks and/or data flows depicted in FIG. 5 (and in the other drawing figures, such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

In block 521, method 500 may include obtaining code coverage information related to lines of code. The code coverage information may indicate how the lines of code are covered by a plurality of tests. A particular line of code being "covered" by a particular test, as used herein, may mean that the particular test has reached that particular line of code and the test has been executed and/or run on that particular line of code. For example, the particular test may test various functionalities (e.g., clicking a particular graphical user interface (GUI) button) of the software application. If the particular line of code is related to the particular GUI button being tested, it may be said that the particular line of code is "covered" by the particular test. On the other hand, if the particular line of code is part of another functionality that is not subject to the particular test, it may be said that the particular line of code is "not covered" by the particular test.

In block 522, method 500 may include generating a two-way mapping based on the code coverage information (e.g., obtained in block 521). The two-way mapping may comprise a first mapping that maps a particular test in the plurality of tests to at least one line in the lines of code that is covered by the particular test. The two-way mapping further comprise a second mapping that maps a particular line of code in the lines of code to at least one test in the plurality of tests that covers the particular line of code. For example, in the first mapping, a first test may be associated with a first set of lines that the first test previously covered according to the code coverage information, a second test may be associated with a second set of lines (e.g., that may or may not overlap with the first set of lines) that the second test previously covered according to the code coverage information, and so on. The second mapping, on the other hand, may show that which tests covered a particular line of code. For example, a first line may be associated with a first set of tests that previously covered the first line according to the code coverage information, a second line may be associated with a second set of tests (e.g., that may or may not overlap with the first set of tests) that previously covered the second line according to the code coverage information, and so on.

Referring back to FIG. 1, code coverage information generate engine 133 may be responsible for implementing block 521. Mapping store engine 134 may be responsible for implementing block 522.

Figure 6:
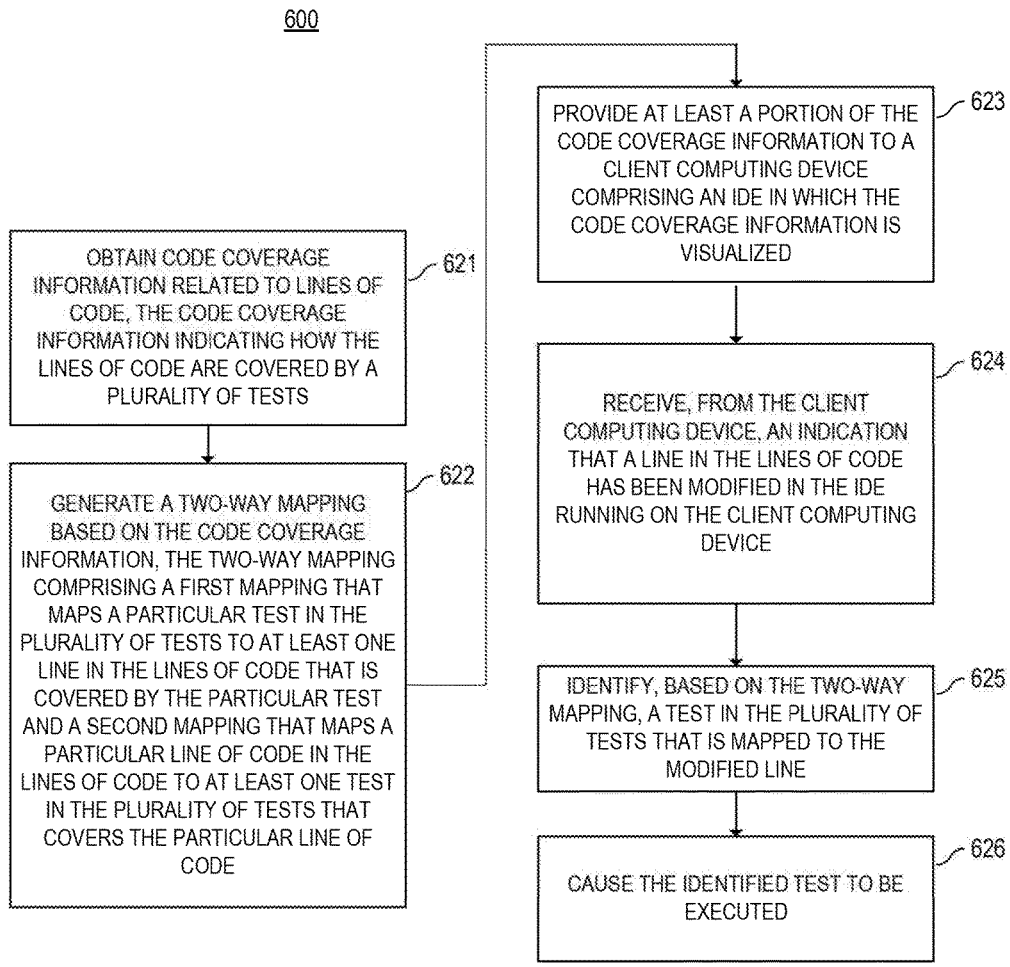
FIG. 6 is a flow diagram depicting an example method for providing code coverage information.

FIG. 6 is a flow diagram depicting an example method 600 for providing code coverage information. Method 600 as illustrated (and described in greater detail below) is meant be an example and, as such, should not be viewed as limiting. Method 600 may be implemented in the form of executable instructions stored on a machine-readable storage medium, such as storage medium 210, and/or in the form of electronic circuitry.

In block 621, method 600 may include obtaining code coverage information related to lines of code. The code coverage information may indicate how the lines of code are covered by a plurality of tests. A particular line of code being "covered" by a particular test, as used herein, may mean that the particular test has reached that particular line of code and the test has been executed and/or run on that particular line of code. For example, the particular test may test various functionalities (e.g., clicking a particular graphical user interface (GUI) button) of the software application. If the particular line of code is related to the particular GUI button being tested, it may be said that the particular line of code is "covered" by the particular test. On the other hand, if the particular line of code is part of another functionality that is not subject to the particular test, it may be said that the particular line of code is "not covered" by the particular test.

In block 622, method 600 may include generating a two-way mapping based on the code coverage information (e.g., obtained in block 621). The two-way mapping may comprise a first mapping that maps a particular test in the plurality of tests to at least one line in the lines of code that is covered by the particular test. The two-way mapping further comprise a second mapping that maps a particular line of code in the lines of code to at least one test in the plurality of tests that covers the particular line of code. For example, in the first mapping, a first test may be associated with a first set of lines that the first test previously covered according to the code coverage information, a second test may be associated with a second set of lines (e.g., that may or may not overlap with the first set of lines) that the second test previously covered according to the code coverage information, and so on. The second mapping, on the other hand, may show that which tests covered a particular line of code. For example, a first line may be associated with a first set of tests that previously covered the first line according to the code coverage information, a second line may be associated with a second set of tests (e.g., that may or may not overlap with the first set of tests) that previously covered the second line according to the code coverage information, and so on.

In block 623, method 600 may include providing at least a portion of the code coverage information to a client computing device (e.g., client computing device 140 of FIG. 1) comprising an integrated development environment (IDE) (e.g., IDE 145 of FIG. 1) in which the code coverage information is visualized. The visualization of the code coverage information is further discussed herein with respect to visualization engine 143. For example, a first line in the lines of code may be shown visually different (e.g., different color-coding) from a second line in the lines of code based on the code coverage information.

In block 624, method 600 may include receiving, from the client computing device, an indication that a particular line in the lines of code has been modified (e.g., when the developer modifies the particular line in the IDE running on the client computing device). This may include obtaining, from the client computing device, the modified line. This may trigger and/or cause the plurality of tests (or any portion thereof) to be executed and/or run (e.g., as discussed herein with respect to test execute engine 132). In some instances, the tests that previously covered the particular line prior to the modification may be identified and/or executed for the purpose of speed and efficiency. Such tests may be identified by, for example, referring to the two-way mapping.

In block 625, method 600 may include identifying, based on the two-way mapping (e.g., generated in block 622), a particular test in the plurality of tests that is mapped to the modified line. For example, the two-way mapping may provide information regarding which tests previously covered the particular line prior to the modification.

In block 626, method 600 may cause the identified test (e.g., identified in block 625) to be executed.

Referring back to FIG. 1, code coverage information generate engine 133 may be responsible for implementing blocks 621 and 623. Mapping store engine 134 may be responsible for implementing block 622. Code obtain engine 131 may be responsible for implementing block 624. Test execute engine 132 may be responsible for implementing blocks 625-626.

FIG. 7 is a diagram depicting an example user interface 700 for providing code coverage information. User interface 700 (and other user interfaces described herein) may be used to cause various actions to be performed by code coverage information system 110.

FIG. 7 is discussed herein with respect to FIG. 1.

The foregoing disclosure describes a number of example implementations for providing code coverage information. The disclosed examples may include systems, devices, computer-readable storage media, and methods for providing code coverage information. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing, from the scope of the disclosed examples. Furthermore, implementations consistent, with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method comprising:
obtaining code coverage information related to lines of code;
generating a two-way mapping based on the code coverage information, the two-way mapping comprising a first mapping that maps a particular test in the plurality of tests to at least one line in the lines of code that is covered by the particular test and a second mapping that maps a particular line of code in the lines of code to at least one test in the plurality of tests that covers the particular line of code;
receiving, from a client computing device, an indication that a new line has been added to the lines of code in an integrated development environment (IDE) running on the client computing device;
causing the plurality of tests to be executed; and
obtaining the code coverage information related to the new line, wherein the code coverage information related to the new line comprises at least one of: a first indication that the new line passed all of the tests covering the new line, a second indication that the new line failed at least one test covering the new line, or a third indication that the new line is not covered by any of the plurality of tests.

2. The method of claim 1, further comprising:
receiving, from a client computing device, an indication that a line in the lines of code has been modified in an integrated development environment (IDE) running on the client computing device;
identifying, based on the two-way mapping, a test in the plurality of tests that is mapped to the modified line; and
causing the identified test to be executed.

3. The method of claim 1, further comprising:
providing at least a portion of the code coverage information to a client computing device comprising an integrated development environment (IDE) in which the code coverage information is visualized.

4. The method of claim 3, wherein a first line in the lines of code is shown visually different from a second line in the lines of code based on the code coverage information.

5. A non-transitory machine-readable storage medium comprising instructions executable by a processor of a client computing device for providing code coverage information, the machine-readable storage medium comprising:

instructions to identify a first set of changed lines of code that represents changes made to lines of code using an integrated development environment (IDE) running on the client computing device;
instructions to transmit the first set of changed lines of code to a server computing device;
instructions to receive, from the server computing device, code coverage information associated with the first set of changed lines of code, wherein the code coverage information is associated with the first set of changed lines of code indicating how the first set of changed lines of code is covered by a plurality of tests, and the first set of changed lines of code represents the changes made during a first time period between a first timestamp and a second timestamp;
instructions to determine a visual indicator that corresponds to the code coverage information associated with individual lines in the first set of changed lines of code; and
instructions to cause a display of the first set of changed lines of code with corresponding visual indicators via the IDE;
instructions to identify a second set of changed lines of code that represents the changes made to the lines of code using the IDE during a second time period between the second timestamp and a third timestamp;
instructions to transmit the second set of changed lines of code to the server computing device;
instructions to receive, from the server computing device, the code coverage information associated with the second set of changed lines of code, the code coverage information associated with the second set of changed lines of code indicating how the second set of changed lines of code is covered by a plurality of tests;
instructions to determine a visual indicator that corresponds to the code coverage information associated with individual lines in the second set of changed lines of code; and
instructions to cause a display of the second set of changed lines of code with corresponding visual indicators via the IDE.

6. The non-transitory machine-readable storage medium of claim 5, wherein the individual lines in the first set of changed lines of code are color-coded according to the corresponding visual indicators.

7. The non-transitory machine-readable storage medium of claim 5, wherein the changes are made to the lines of code when at least one line is newly added to the lines of code or when at least one line in the lines of code is modified.

8. The non-transitory machine-readable storage medium of claim 5, wherein the changes made to the lines of code are tracked via a version-control system.

9. A system comprising:
a hardware processor that:
generates code coverage information related to lines of code, the code coverage information indicating how the lines of code are covered by a plurality of tests; and
stores, in a data storage, a two-way mapping based on the code coverage information, the two-way mapping comprising a first mapping that maps a particular test in the plurality of tests to at least one line in the lines of code that is covered by the particular test and a second mapping that maps a particular line of code in the lines of code to at least one test in the plurality of tests that covers the particular line of code;
obtains, from a client computing device, a line in the lines of code that has been modified using an integrated development environment (IDE) running on the client computing device, wherein the code coverage information related to the modified line comprises at least one of: a first indication that the modified line passed the identified test, a second indication that the modified line failed the identified test, or a third indication that the modified line is not covered by the identified test;

identifies, based on the two-way mapping, a test in the plurality of tests that is mapped to the modified line;

execute a testing script corresponding to the identified test; and sends the code coverage information related to the modified line to the client computing device comprising the IDE in which the code coverage information is visualized.

10. The system of claim 9, the processor that:

generates the code coverage information related to the modified line based on the execution of the testing script corresponding to the identified test.

* * * * *